356-138 SR
MTR12 OR 3,461,566
ALIGNING METHOD AND APPARATUS
Filed Aug. 19, 1966
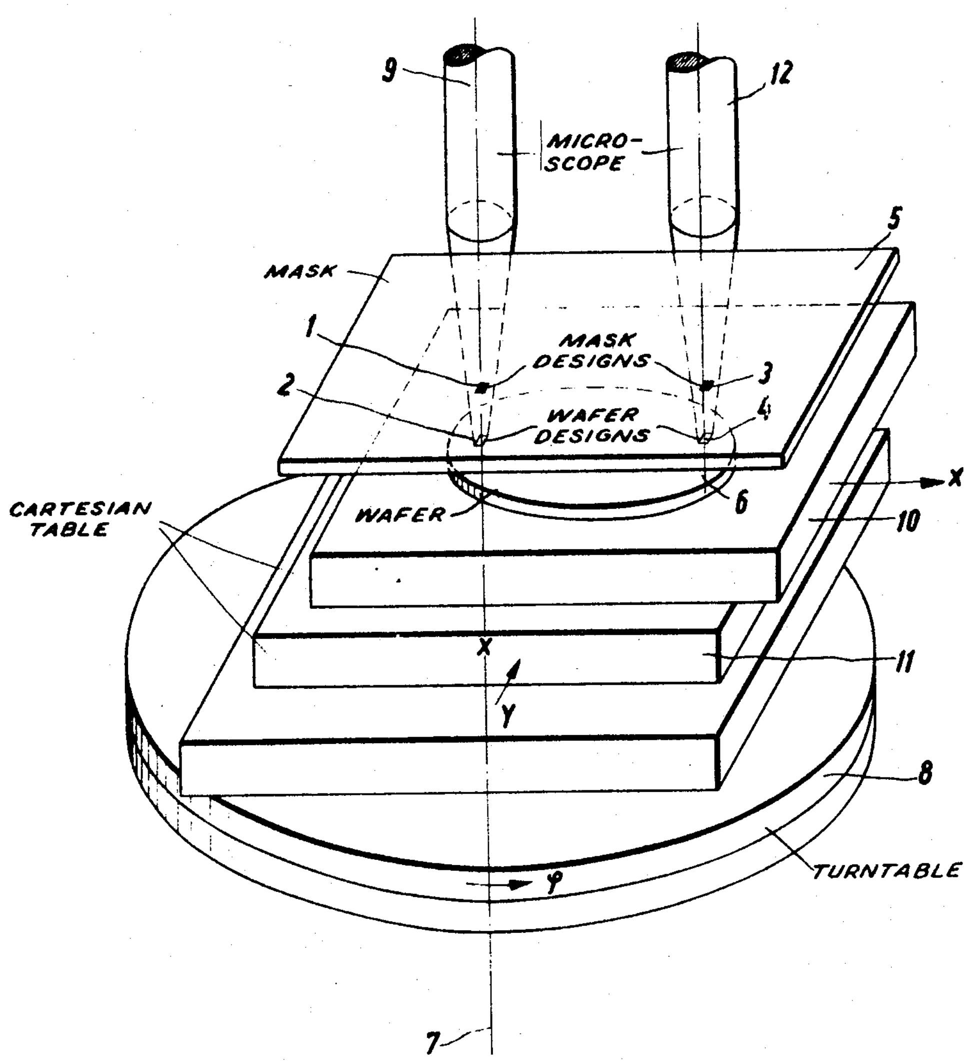
Inventor:
Dieter Gerstner
By: Spencer & Kaye
Attorneys 3,461,566

ALIGNING METHOD AND APPARATUS

Dieter Gerstner, Heilbronn, Germany, assignor to Telefunken Patentverwertungsgesellschaft m.b.H., Ulm (Danube), Germany Filed Aug. 19, 1966, Ser. No. 573,545
Claims priority, application Germany, Aug. 20, 1965, T 29,257
Int. Cl. G01b 5/14
U.S. Cl. 33—180 3 Claims

ABSTRACT OF THE DISCLOSURE

Method and apparatus for aligning a semiconductor disc or wafer with a mask, each of which have a plurality of designs, where at least two of the designs on the mask must be aligned with corresponding designs on the disc. Two designs on the mask and the corresponding two designs on the disc are chosen which are spaced apart as far as possible from each other. The alignment, which is effected by bringing the two designs on the mask into alignment with the two designs on the disc, is accomplished in two steps by bringing one design on the mask and one design on the disc into alignment with each other and then rotating the mask and the disc with respect to each other about a pivot axis that passes through the already aligned designs until the other design on the mask is aligned with the other design on the disc.

The present invention relates to a method for aligning a semiconductor disc and mask with respect to each other, this being done by aligning, at two places, designs on the mask with respect to corresponding designs on the semiconductor disc.

Present day manufacturing techniques for making semiconductor elements and integrated circuits employ various diffusion steps which themselves involve various masking techniques. Thus, when planar transistors are made, the semiconductor disc is subjected to various diffusion processes, prior to each of which the semiconductor disc is provided with an oxide coating, with those parts of the coating which are not to be etched away having to be covered photolithographically. If, for example, the emitter zones are to be diffused into the base zones of planar transistors contained in a semiconductor disc, the photomask has to be aligned prescisely on the semiconductor disc so as to obtain an opening which is to serve as the emitter diffusion window in the oxide coating. Such a photomask contains the outline of the emitter window which must be so positioned on the base structure of the semiconductor disc that the emitter window of the photomask falls precisely into the region of the base on the semiconductor disc. Normally, the semiconductor disc must be subjected to further oxidation processes for the purpose of contacting the individual zones; new contacting windows are then provided with the help of the photomasking techniques, after the mask has been aligned. Moreover, metal masks are used for purposes of vaporization processes, for example, for vaporizing conductive strips or layers or resistances onto a semiconductor body.

In order to obtain precise alignment, it is essential that the designs on the mask which are to be positioned are spaced apart the same distance as the designs on the semiconductor discs. Therefore, the designs on the semiconductor disc and on the photomask are usually arranged in accordance with a periodic raster.

A device for aligning the semiconductor discs with respect to the masks must be constructed in such a way that one of the parts to be adjusted can move with respect to the other both in the direction of the Cartesian coordinates and also so as to be rotated with respect thereto. In all heretofore conventional adjusting steps, two regions on the parts to be adjusted are arranged as far as possible from each other, these regions then being made to coincide with each other.

In order properly to align semiconductor discs with respect to masks, the accuracy with which the designs are brought into registration with each other must be exceedingly high, it being, moreover, necessary to observe the adjustment under a microscope. Without the use of any auxiliary equipment, it is simply not possible to align the parts manually, instead, one of the two components to be aligned is placed on a device which is displaceable in the direction of the Cartesian coordinates and which is also rotatable. In one heretofore known piece of equipment, one of the components to be aligned, whose position is to be changed with respect to the stationary component, is mounted on a turntable which can be rotated by means of a set screw. This turntable is mounted on a so-called Cartesian table, the same comprising a carriage which is movable in a groove, the part having this groove itself being mounted on a further carriage which is movable in a direction at right angles to the groove. The carriages can be displaced at right angles with respect to each other by means of spindles or set screws.

Generally, the magnification of the microscope has to be so great that only one or at most a few designs can be seen on the component to be aligned. In practice, the components have to be aligned with an accuracy of, for example, $\pm 2$ $\mu$m. and it will therefore be readily understood that if there is even a slight angular deviation at the first aligning site, the regions which are to be brought into registration with each other at a further aligning site are spaced far from each other. Thus, if there is an angular deviation at the first aligning site of 0.015°, assuming the semiconductor disc to have a diameter of 20 mm. there will at the second aligning site be a maximum error of 5 $\mu$m., this error being outside of the permissible tolerance.

In view of the above, it was heretofore customary to align the two components, i.e., the mask and the semiconductor disc, by means of a time-consuming repetitive process at the different sites. In such a method, the microscope is shifted from one place to the other, or a twin-objective type microscope is used which allows the two aligning sites to be observed simultaneously. All of these methods, however, have the drawback that the error has to be slowly decreased by continuously changing the location of the sites, so that aligning the components often became exceedingly time-consuming.

This, then, is the present state of the art. In order to make it possible to produce semiconductor devices as simply and as rapidly as possible, the semiconductor disc is adjusted with respect to the mask with the help of two arbitrary designs on the semiconductor disc which are brought into registration with two corresponding designs on the mask, and all heretofore known methods involve time consuming repetitive or so-called iteration steps.

It is, therefore, the primary object of the present invention to provide a way in which to overcome the drawbacks of the prior art, and this, in accordance with the present invention, is accomplished in the following manner. After one of the lot of designs on the mask has been brought into registration with a corresponding design on the semiconductor disc any deviation between the corresponding designs on the mask and on the disc is corrected in that a second design on the mask in a large distance from the first design and its corresponding design on the semiconductor disc are brought into registration with each other solely by rotating the disc or the mask about pivot axis passing through the site where the already aligned designs are located.

This aligning method is particularly significant when two components are to be aligned with respect to each other. The method can be used for aligning either photomasks or metal masks with respect to semiconductor discs.

In all heretofore customary methods and the apparatus used for carrying out such methods, it was assumed that both the microscope as well as one of the two components which were to be aligned with respect to each other had to be movable in all directions. The heretofore customary repetitive process used in carrying out the alignment led to the opinion that all of the design sites on the semiconductor disc and the mask should be observable during and after the alignment. For this reason, the apparatus was equipped not only with a Cartesian table mounted on a turntable but also with a microscope which was movable in all directions. Thus, in those pieces of equipment, there is, in contradistinction to the present invention, no preferred point. That is to say, the apparatus for carrying out the alignment in accordance with the present invention is so constructed that initially there is a preferred point, the same being at the first design site, which point then forms the pivot point for aligning the designs at the second site.

The method according to the present invention has the great advantage that only two aligning steps are needed, in contradistinction to the heretofore customary numerous repetitive steps. The apparatus for carrying out the aligning method according to the present invention is preferably so constituted that the first design to be aligned lies in the pivot axis of the turntable. In heretofore customary alignments, it was disadvantageous that every time one of the components to be adjusted had to be shifted, the pivot point of the turntable was shifted as well. This drawback is avoided in that the pivot point of the turntable is held stationary during the shifting of one of the parts in the directions of the Cartesian coordinates.

Additional objects and advantages of the present invention will become apparent upon consideration of the following description when taken in conjunction with the accompanying drawing in which the single figure is a perspective illustration of an apparatus according to the present invention.

Referring now to the drawing, the same shows an apparatus by means of which the designs 1 and 2 and the designs 3 and 4 on the mask 5 and on the semiconductor disc 6 are to be positioned so as to coincide with each other. As a rule, a semiconductor disc for producing a lot of same semiconductor elements contains a great number of same designs side by side and the mask contains the corresponding designs. Any design 1 on the mask has to be aligned on a corresponding design 2 on the disc. By aligning still another design 3 on the mask on a corresponding design 4 on the disc all the designs on the mask are aligned on the corresponding designs on the disc. The apparatus is so constructed that when the stationary mask 5 is held in place, a design 1 on the mask coincides with the pivot axis 7 of a rotary device such as a turntable 8. The adjustment at the site of the designs 1 and 2 is observed by means of the microscope 9. The carriages 10 and 11 are then displaced in the *x* and *y* directions, respectively, that is to say, in the directions of the axes of the Cartesian coordinate system, until the designs 1 and 2 overlie each other and are thus in registration with each other. A visible angular deviation between the designs 1 and 2 is corrected by rotating the turntable 8 about the axis 7. The objective 12 is used to observe the second adjusting site where the designs 3 and 4 are located. Any recognizable deviation in the position of these designs can only be due to a not as yet corrected angular deviation between the mask 5 and the semiconductor 6. Therefore, the semiconductor disc 6 is rotated by means of the turntable 8 with respect to the mask 5 until the designs 3 and 4 are also brought into registration with each other. It will be noted that this will not affect the adjustment of the designs 1 and 2 with respect to each other since all that is involved is rotation of a coordinate system about its origin which, in this case, is in the center of the designs 1 and 2 which have been brought into registration with each other. Thus, after the designs 3 and 4 have been brought into alignment with each other, the aligning process as a whole is finished, and the highest possible accuracy has been obtained.

The sites of the designs 1, 2, 3 and 4 can be observed with one or two microscopes. If only one microscope is used, the same can be moved from one site to the other, or the entire moving device, incorporating the parts 8, 10, 11 is moved in such a way that the particular site to be observed comes to lie beneath the objective of the microscope. The amount which the microscope or the moving apparatus is displaced can be limited by means of suitable adjustable stops.

In lieu of two microscopes, a twin-objective type microscope can be used with one of the objectives trained with its optical axis on the pivot axis of the turntable and, thus, on the site of designs 1 and 2, and the other objective trained on the site of designs 3, 4. This microscope can be so arranged as to give a composite picture of the two sites; i.e., so that one section of the image reproduces one site and another section reproduces the other site. Alternatively, the microscope can be be switched in such a way that first one and then the other site is observed. But in any event, the sequence in which the above-described aligning steps themselves are carried out remains the same.

The movable parts 10, 11 of the Cartesian table and of the turntable 8 can be moved by means of threaded spindles or by means of suitable lever systems.

Alternatively, the arrangement can be so constructed that it is the semiconductor disc which is moved in the directions of the Cartesian coordinates with respect to the mask, while the mask is turned with respect to the semiconductor disc by means of a suitable device. Again, one of the aligning sites will lie in the turning axis of the rotary device.

According to a further modification, the semi-conductor disc is rotated with respect to the mask, while the mask is displaced with respect to the semiconductor disc in the directions of the Cartesian coordinates.

It will thus be seen that, in accordance with the present invention, there is provided a method and apparatus for aligning with respect to each other a semiconductor disc and a mask, such as a photomask for vapor deposition, where the disc and mask each have thereon a plurality of designs, from which at least two designs on the mask have to be aligned on corresponding designs on the disc, the two designs on the disc being spaced a distance as far as possible from each other and the two corresponding designs on the mask being spaced the same distance from each other, and where the alignment of the disc and mask is effected by bringing the two designs on the disc and mask into alignment with each other. In accordance with the present invention, the mask and disc are aligned with each other by bringing one design on the mask and one design on the disc into alignment with each other, and by bringing the other design on the mask and the other design on the disc into alignment with each other solely by rotating the mask and disc with respect to each other about a pivot axis which passes through the two already aligned designs. In practice, either the mask or disc may be held stationary during the alignment processes, with the other component being moved in the the course of both aligning steps. Alternatively, one of the components can be held stationary during one alignment step and the other component can be held stationary during the other alignment step.

It will also be seen that, in accordance with the present invention, one of the designs on the mask and one of the designs on the disc are brought into alignment with each other with the help of a Cartesian table, i.e., a table which allows the component it holds to be moved in the directions of the Cartesian coordinate system, while another design on the mask and the corresponding design on the disc are brought into alignment with the help of a turntable whose axis passes through the two already aligned designs on the mask and disc. In practice, suitable microscope means are provided to allow both of the sites at which designs are brought into alignment with each other to be observed. In practice it is usual to take as the first design simply that one of all that lies nearest the center of the microscope, i.e., nearest to the pivot axis of the turntable.

It will be understood that the above description of the present invention is susceptible to various modifications, changes, and adaptation.

What is claimed is:

1. A method of aligning with each other a semiconductor disc element and a mask element, each having thereon a plurality of designs, from which at least two designs on the mask element have to be aligned on corresponding designs on the disc element, the two designs on the disc element being spaced a distance as far as possible from each other and the two corresponding designs on the mask element being spaced the same distance from each other, the alignment of the disc and mask elements being effected by bringing the two designs on the disc and mask elements, respectively, into alignment with each other, said method comprising the steps of:

(a) aligning one of said two designs of a first one of said elements with the pivot axis of a turntable;

(a) arranging the second one of said elements on said turntable with one of said two designs thereof in line with the pivot axis of said turntable;

(c) rotating said turntable, and with it said second element, about said pivot axis until the other of said two designs on said mask element and the other of said two designs on said disc element are aligned with each other.

2. The method defined in claim 1, wherein said mask element is a photomask for illuminating a layer of photolacquer.

3. The method defined in claim 1, wherein said mask element is a metal mask for vapor deposition.

References Cited

UNITED STATES PATENTS

| | | | |
|---|---|---|---|
| 2,480,618 | 8/1949 | Tresidder. | |
| 2,764,817 | 10/1956 | Schwartz | 33—189 |
| 2,906,161 | 9/1959 | Thompson. | |
| 2,960,913 | 11/1960 | Herrala. | |
| 3,192,844 | 7/1965 | Szasz et al. | 95—73 |
| 3,245,794 | 4/1966 | Conley | 29—578 X |
| 3,334,541 | 8/1967 | Delp | 95—73 X |

WILLIAM D. MARTIN, Jr., Primary Examiner

U.S. Cl. X.R.

29—578; 33—46, 174; 96—36.2